United States Patent
Kawae et al.

(10) Patent No.: US 6,179,902 B1
(45) Date of Patent: *Jan. 30, 2001

(54) APPARATUS FOR RECOVERING, REFINING, AND STORING HYDROGEN GAS

(75) Inventors: Takayuki Kawae, Nagoya; Tomonori Takahashi, Chita; Osamu Sakai, Nagoya, all of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/006,829

(22) Filed: Jan. 14, 1998

(30) Foreign Application Priority Data

Jan. 20, 1997 (JP) .................................... 9-007486

(51) Int. Cl.[7] .................................................. B01D 53/22
(52) U.S. Cl. ........................................ 96/4; 95/56
(58) Field of Search .............................. 95/55, 56; 96/4, 96/10, 11

(56) References Cited

U.S. PATENT DOCUMENTS

| | | | |
|---|---|---|---|
| 3,251,652 | 5/1966 | Pfefferle | 23/213 |
| 3,336,730 | * 8/1967 | McBride et al. | 95/56 |
| 3,365,276 | * 1/1968 | Childs et al. | 95/56 X |
| 4,063,937 | * 12/1977 | Goltsov et al. | 95/56 X |
| 4,255,591 | * 3/1981 | Makin et al. | 95/56 X |
| 4,548,618 | * 10/1985 | Linde et al. | 95/55 X |
| 4,875,945 | * 10/1989 | Penzhorn et al. | 95/56 X |
| 4,881,953 | * 11/1989 | Prasad et al. | 96/11 X |
| 4,892,564 | * 1/1990 | Cooley | 95/55 |
| 5,131,930 | * 7/1992 | Vines | 95/55 |
| 5,157,200 | * 10/1992 | Mikkinen et al. | 95/55 X |
| 5,181,942 | * 1/1993 | Jain | 95/45 |
| 5,217,506 | * 6/1993 | Edlund et al. | 95/56 |
| 5,318,688 | 6/1994 | Najjar et al. | 205/150 |
| 5,393,328 | * 2/1995 | Barbe | 96/4 |
| 5,449,848 | * 9/1995 | Itoh | 95/56 X |
| 5,470,379 | * 11/1995 | Garrett | 96/4 |
| 5,503,657 | * 4/1996 | Bouard et al. | 95/55 X |

FOREIGN PATENT DOCUMENTS

| | | | |
|---|---|---|---|
| 0 715 880 | 6/1996 | (EP) . | |
| 1 195 852 | 6/1970 | (GB) . | |
| 63-282103 | * 11/1988 | (JP) | 95/56 |
| 63-295402 | 12/1988 | (JP) . | |
| 6-345409 | 12/1994 | (JP) . | |

OTHER PUBLICATIONS

Uemiya et al., "Hydrogen permeable palladium–silver alloy membrane supported on porous ceramics", *Journal of Membrane Science*, 56 (1991) 315–325.

* cited by examiner

Primary Examiner—Robert H. Spitzer
(74) Attorney, Agent, or Firm—Kubovcik & Kubovcik

(57) ABSTRACT

An apparatus for recovering, refining, and storing hydrogen gas, includes: a recovery and refinement line for recovering and refining hydrogen gas used for a hydrogen furnace or used as a process gas; a storage tank for storing refined gas; and a resupply line for resupplying a stored gas to the hydrogen furnace or as a process gas. A palladium film is installed in the recovery and refinement line and lets hydrogen gas permeate the palladium film so as to be refined.

6 Claims, 1 Drawing Sheet

APPARATUS FOR RECOVERING, REFINING, AND STORING HYDROGEN GAS

BACKGROUND OF THE INVENTION AND RELATED ART STATEMENT

The present invention relates to an apparatus for recovering, refining, and storing hydrogen gas. The apparatus enables used hydrogen gas having a low purity to be reused for a hydrogen furnace or as a process gas by refining the used hydrogen gas and storing the refined hydrogen gas.

As hydrogen gas for a hydrogen furnace or as a process gas, or the like, there is used hydrogen gas having a high purity of 99.9% or more so as to avoid oxidation and carbonization of is products. However, the purity drops to 70–99.0% because impure gas, or the like, is mixed therein. Hydrogen gas of decreased purity has conventionally been regarded as an unreusable gas and disposed of by combustion.

When hydrogen gas is carried by a loader out of a hydrogen manufacturing operation to a tank, or when hydrogen gas is produced with an on-site hydrogen producing apparatus, disposal of hydrogen by combustion after every use has had a great loss in view of energy saving and cost.

There has been proposed an apparatus for refining hydrogen gas having a decreased purity with a hydrogen occlusion alloy as a technique to highly purify and reuse a hydrogen gas having a decreased purity by refining. In the apparatus, hydrogen gas having a decreased purity is introduced into a refinement container, only hydrogen gas is absorbed by a hydrogen occlusion alloy installed in the refinement container, the remaining impurity is discharged from the system, and then the hydrogen gas is released from the hydrogen occlusion alloy to be stored in a tank.

However, in the aforementioned apparatus, repeated occlusion of hydrogen gas pulverizes the hydrogen occlusion alloy, and it sometimes happens that the pulverized alloy is mixed in the hydrogen gas.

Release of hydrogen gas from the hydrogen occlusion alloy is an endothermic reaction, while occlusion of hydrogen gas by the hydrogen occlusion alloy is an exothermic reaction. Therefore, the hydrogen occlusion alloy has to be subjected alternatively to heating and cooling so as to occlude and release hydrogen gas. Thus, the apparatus requires a complex treatment.

Further, in the aforementioned apparatus, it has been difficult to continuously supply a certain amount of a refined gas because one refinement container is not sufficient for simultaneously conducting occlusion and release. Accordingly, two or more refinement containers have generally been used and operated by alternating the containers so that one is in an occlusion process when the other is in release process. Since a fluctuation of an amount of supply of a refined gas has been controlled to be small, the operation was complex, and the structure of the apparatus has become more intricate.

The present invention was made in consideration of the aforementioned conditions. The object of the present invention is to provide a recovery, refinement, and storage apparatus for hydrogen gas which is free from mixing with a pulverized alloy, which apparatus is easily operated, the structure of which is simple, and which can continuously supply a certain amount of refined gas.

SUMMARY OF THE INVENTION

According to the present invention, there is provided an apparatus for recovering, refining, and storing hydrogen gas, comprising:

a recovery and refinement line for recovering and refining hydrogen gas to be used for a hydrogen furnace or used as a process gas;

a storage tank for storing refined gas; and a resupply line for resupplying gas stored in the storage tank to the hydrogen furnace or as a process gas;

wherein a palladium film is installed in the recovery and refinement line and allows hydrogen gas to permeate the palladium film so as to be refined.

Incidentally, in the present invention, hydrogen gas having a purity of 70–99.0% which is lowered by use can be refined so as to have a high purity of 99.9% or more.

Additionally, an oil-removal means for removing oil vapor mixed in the hydrogen gas is preferably arranged in the upstream portion of the palladium film installed in the recovery and refinement line.

Further, an oxygen-removal means for removing oxygen mixed in hydrogen gas is preferably arranged in the former portion of the palladium film installed in a recovery and refinement line.

Furthermore, a filter for removing metallic powder mixed in the hydrogen gas is preferably arranged in the upstream portion of the palladium film installed in the recovery and refinement line.

A pressure-increasing means is preferably arranged between the palladium film installed in the recovery and refinement line and the storage tank.

Furthermore, a heat exchanger is arranged in the upstream and/or downstream portion(s) of the palladium film installed in the recovery and refinement line.

DETAILED DESCRIPTION OF THE PREFERRED EMBODIMENTS

Figure 1:
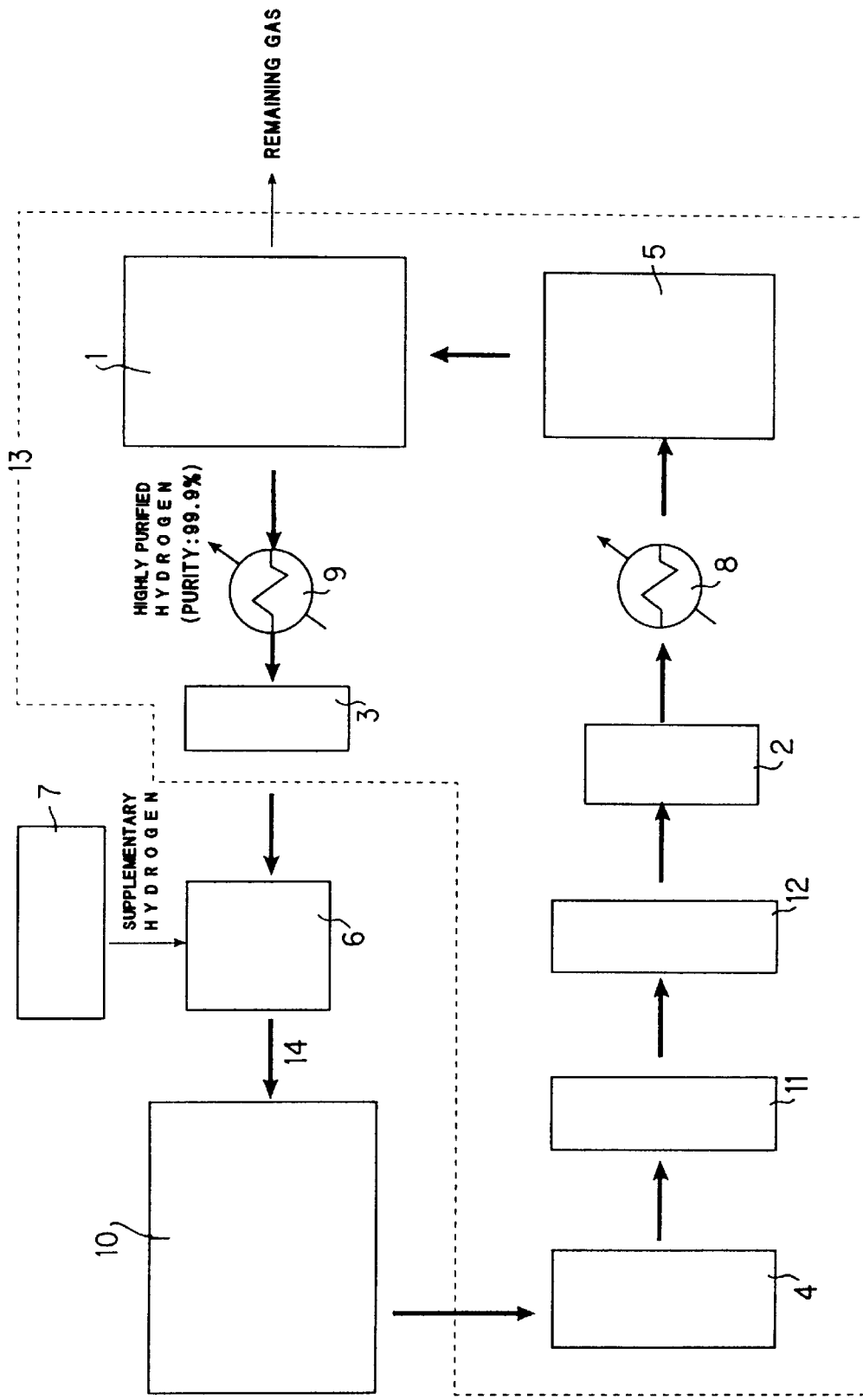
FIG. 1 is an explanatory view showing an outline of an apparatus of the present invention.

In an apparatus for recovering, refining, and storing hydrogen of the present invention, a palladium film capable of selectively letting only hydrogen gas permeate is installed in a recovery and refinement line. Hydrogen gas having a low purity and containing impure gas is refined to obtain hydrogen gas having high purity (purity of 99.9% or more) and stored in a storage tank, thereby enabling repeated use.

Such an operation and equipment of the present invention, which is simple in comparison with a conventional operation and equipment, enables a certain amount of refined gas to be continuously supplied.

In the present invention, a recovery and refinement line means an apparatus into which hydrogen gas having a lowered purity by use in a hydrogen furnace, or the like, is introduced and refined to obtain high purity by a palladium film unit installed in the line.

Incidentally, in the present invention, a palladium film of a palladium film unit means a film containing palladium as a main component and includes a film containing only palladium and a film made of alloy of palladium and another metal.

As palladium or a palladium alloy, there can be used known ones which solve hydrogen gas in a solid and allow the hydrogen gas to permeate. A palladium alloy is preferably used for preventing palladium from hydrogen embrittling and for improving separation efficiency at a high temperature. The palladium alloy further preferably includes Ag, which has a high ability of preventing hydrogen embrittlement.

Incidentally, the content of metals except for palladium is preferably within the range of from 10 wt % to 30 wt % as stated in Japanese Membrane Science, 56(1991)315–325: "Hydrogen Permeable Palladium—Silver Alloy Membrane Supported on Porous Ceramics" or in Japanese Patent Laid-Open Publication 63-295402.

As a palladium alloy thin film, there is preferably used a thin film containing palladium and silver and having a relatively uniform distribution of density of a silver component in a direction of thickness of the thin film. Palladium and silver can be uniformly distributed by forming a palladium thin film by chemical plating on a surface of a heat resistant porous support, subsequently forming a silver thin film by chemical plating on the palladium thin film, and then applying a thermal treatment.

A palladium film has a thickness of preferably 50 $\mu$m or less and more preferably 20 $\mu$m or less. When the palladium film is thicker than 50 $\mu$m, diffusion of a fuel gas in a gas separation film requires a longer time, and this, in turn, requires a longer time for treatment.

When the support has a tubular shape, coating of a gas separation film is applied only on one of or on both the interior surface and the exterior surface.

A pressure-increasing instrument such as a compressor is preferably arranged as a pressure-increasing means at the upstream portion (the side of the hydrogen gas containing impurities) of a palladium film installed in a recovery and refinement line. This is because it is necessary to have a difference in pressure between the side of the hydrogen gas containing impurities and the side of the refined hydrogen gas, i.e., to maintain a higher pressure in the side of the hydrogen gas containing impurities than in the side of refined hydrogen gas so that hydrogen gas permeates the palladium film.

Since a pressure in the side of the refined hydrogen gas decreases, a pressure-increasing instrument such as a compressor is necessary as a pressure-increasing instrument in the latter part of the palladium film.

Incidentally, there is preferably arranged a means for removing impurities including oil vapor, metallic powder and oxygen gas in the former portion of the palladium film so as to improve refinement efficiency.

In the present invention, a storage tank is a container for temporarily storing refined hydrogen gas having a high purity from the recovery and refinement line and is installed for the purpose of stably supplying refined hydrogen gas to a hydrogen furnace or the like through a resupply line.

Thus, hydrogen gas of lowered purity is refined by a palladium film unit and stored in a tank. This enables hydrogen gas having a purity of 99.9% or more to be continuously introduced into a hydrogen furnace.

In the aforementioned refinement means using a palladium film, it is necessary only to maintain a temperature of gas permeating the film to a certain value or higher so that properties of the palladium film are sufficiently exhibited, and a repeated operation of heating and cooling is not necessary unlike a conventional apparatus using a hydrogen occlusion alloy. Additionally, because of a simple refinement mechanism, a structure of the apparatus can be made simple.

The present invention is hereinbelow described in detail with reference to the drawing. However, the present invention is by no means limited to the Embodiments.

FIG. 1 is an explanatory view showing an outline of an apparatus of the present invention with a hydrogen furnace. Reference numeral 10 denotes a hydrogen furnace, 1 denotes a palladium film unit in which a palladium film is included. Reference numerals 3, 4, 5, 6 and 7 denote a pressure-increasing instrument, an oil-removal tube, an oxygen-removal tube, a storage tank, and a spare tank for supplementing the hydrogen. Reference numerals 8 and 9 denote heat exchangers for increasing temperature. Reference numerals 11, 12, 13, and 14 denote a desulfurizer, a filter, a recovery and refinement line, and a resupply line. Incidentally, hydrogen furnace 10 may be substituted by a CV furnace or a large container.

The hydrogen furnace 10 contains hydrogen gas introduced from the storage tank 6. The hydrogen gas is used in the hydrogen furnace 10, and its purity is lowered by mixing in of impure gas. The hydrogen gas is refined so as to have a high purity by palladium film unit 1 in the recovery and refinement line 13. The refined hydrogen gas is stored in the storage tank 6, and then the hydrogen gas is introduced into the hydrogen furnace 10 again by the resupply line 14.

Thus, a hydrogen gas having a purity of 99.9% or more can be introduced into the hydrogen furnace 10 by refining a hydrogen gas having a lowered purity resulting from the mixing in of an impure gas by the palladium film unit 1 and storing in the storage tank 6.

The upstream portion (the side of hydrogen gas Containing impurities) of the palladium film unit 1 in the recovery and refinement line 13 is provided with a pressure-increasing instrument 2 such as a compressor as a pressure-increasing means. This enables a pressure in the impure hydrogen gas side to be made higher than a pressure in the refined hydrogen gas side and to make hydrogen gas pass through the palladium film unit 1.

Further, in order to avoid lowering of pressure in the refined hydrogen gas side, the downstream portion of the palladium film unit 1 in the recovery and refinement line 13 is provided with a pressure-increasing instrument 3 such as a compressor as a pressure-increasing means.

Incidentally, these pressure-increasing instruments have to be non-explosive because hydrogen gas is used and are oil-free without mixing in of an oil mist.

Incidentally, the following apparatus is arranged in the palladium film unit 1 in a recovery and refinement line 13 depending on a kind of impurities in the hydrogen gas.

When an oil vapor is present in hydrogen gas containing impurities, an oil-removal tube 4 is preferably arranged. This can prevent the oil vapor from adhering to the palladium film, thereby avoiding lowering of hydrogen gas permeability. As an oil-removal means, there is suitably used, for example, an activated carbon, which can adsorb and remove an oil vapor.

When a sulfur component resulting from a subject treated in a furnace is mixed in the hydrogen gas containing impurities, a desulfurizer 11 which removes the sulfur component is preferably arranged. This is because adhering of a sulfur component to a palladium film may cause lowering of hydrogen gas permeability.

When a metallic powder is mixed in the hydrogen gas containing impurities, a filter 12 is preferably arranged. This can avoid lowering of airtightness because of pinholes generated by reaction of the metallic powder with the palladium film. As a filter there can be used, for example, a ceramic filter.

When highly densified oxygen ($O_2$) is contained in the hydrogen gas containing impurities, an oxygen-removal tower 5 is preferably arranged. This can control lowering of a recovery rate of hydrogen gas by oxidation of hydrogen on a palladium film and a danger of explosion caused when the oxygen partial pressure on the side of remaining gas rises and becomes within the range of hydrogen combustion.

As an oxygen removing means, there can be suitably used, for example, a matter containing a palladium catalyst, silica gel, and the like. The palladium catalyst is composed mainly of a metallic powder containing palladium as a main component and activates oxidation of hydrogen so that hydrogen reacts with oxygen to give water. Silica gel dehumidifies the water.

Incidentally, an $O_2$ density in hydrogen gas to be treated is preferably lowered to several ppm by the oxygen-removal means before the gas reaches the palladium film.

A storage tank 6 may be provided with a spare tank 7 for supplementing the hydrogen. This enables hydrogen gas having high purity to be supplied more stably.

As described above, a used hydrogen gas can be highly purified by recovery and refining and stored in a storage tank for reuse by an apparatus of the present invention. Further, an apparatus of the present invention has a simple structure and can be easily operated. Furthermore, an apparatus of the present invention is free from scattering or the like of alloy powder, which is caused by an apparatus using a hydrogen occlusion alloy.

What is claimed is:

1. A closed system for recovering, refining, storing and reusing hydrogen gas, which comprises:

a recovery and refinement line comprising a first pressure increasing-means, a first heat exchanger, a second heat exchanger and a second pressure increasing-means, said line being used for recovering and refining hydrogen gas used for a hydrogen furnace or used as a process gas;

a storage tank for storing refined gas;

a resupply line for resupplying gas stored in the storage tank to the hydrogen furnace for use as the process gas; and a palladium film for refining said hydrogen gas installed between said first pressure increasing-means and said first heat exchanger, and said second heat exchanger and said second pressure increasing-means.

2. An apparatus for recovering, refining, and storing hydrogen gas according to claim 1, wherein hydrogen gas having a purity of 70–99.0% which is lowered by use is refined so as to have a high purity of 99.9% or more.

3. An apparatus for recovering, refining, and storing hydrogen gas according to claim 1, wherein an oil-removal means for removing oil vapor mixed in the hydrogen gas is arranged upstream of said palladium film installed in the recovery and refinement line.

4. An apparatus for recovering, refining, and storing hydrogen gas according to claim 1, wherein an oxygen-removal means for removing oxygen mixed in the hydrogen gas is arranged upstream of said palladium film installed in the recovery and refinement line.

5. An apparatus for recovering, refining, and storing hydrogen gas according to claim 1, wherein a filter for removing metallic powder mixed in the hydrogen gas is arranged upstream of said palladium film installed in the recovery and refinement line.

6. An apparatus for recovering, refining, and storing hydrogen gas according to claim 1, wherein a spare tank for supplementation is arranged in said storage tank.

* * * * *